Figure 4:
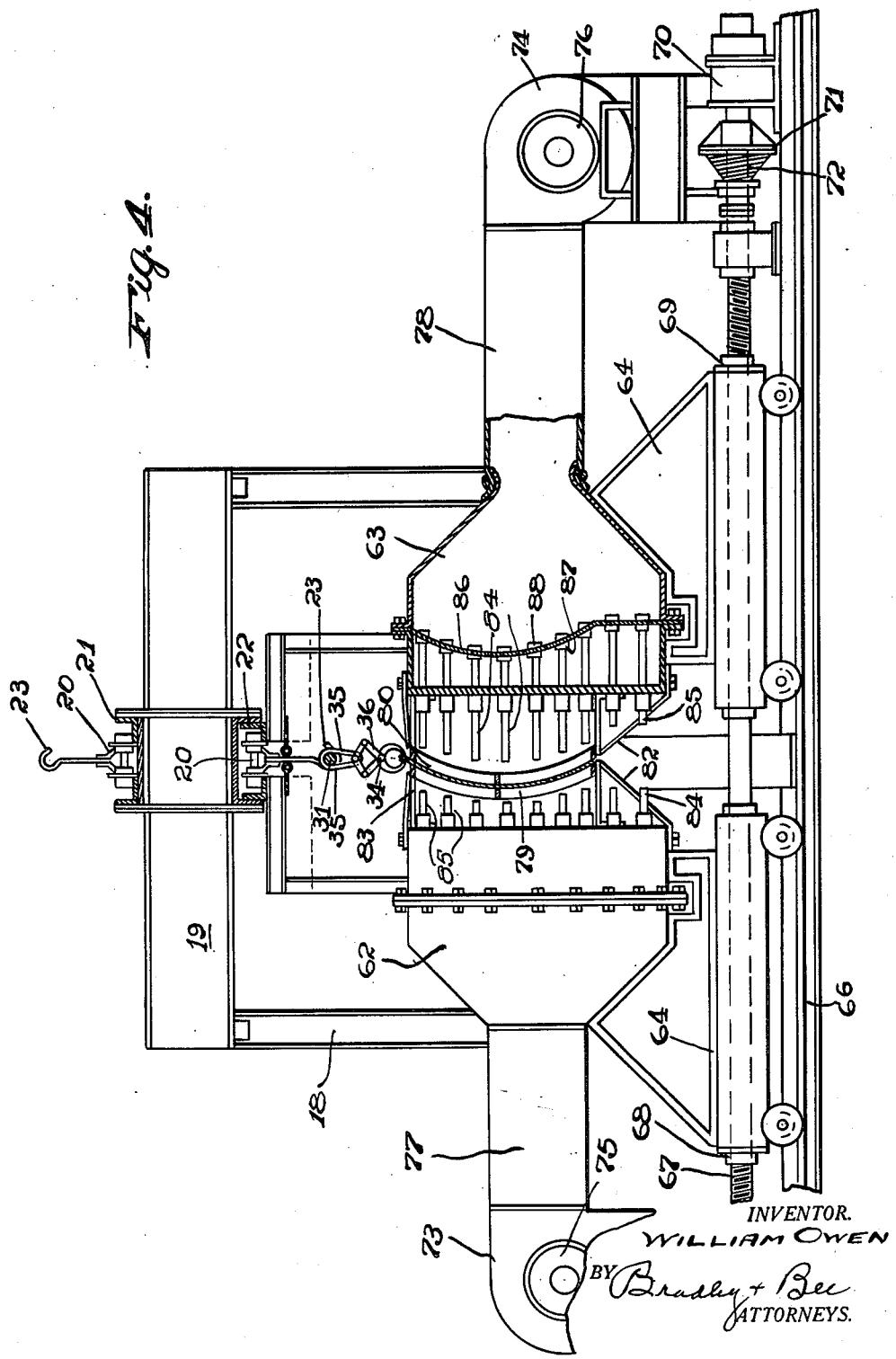

July 29, 1941. W. OWEN 2,251,159
PROCESS AND APPARATUS FOR BENDING AND TEMPERING GLASS SHEETS
Filed Dec. 9, 1936 6 Sheets-Sheet 1
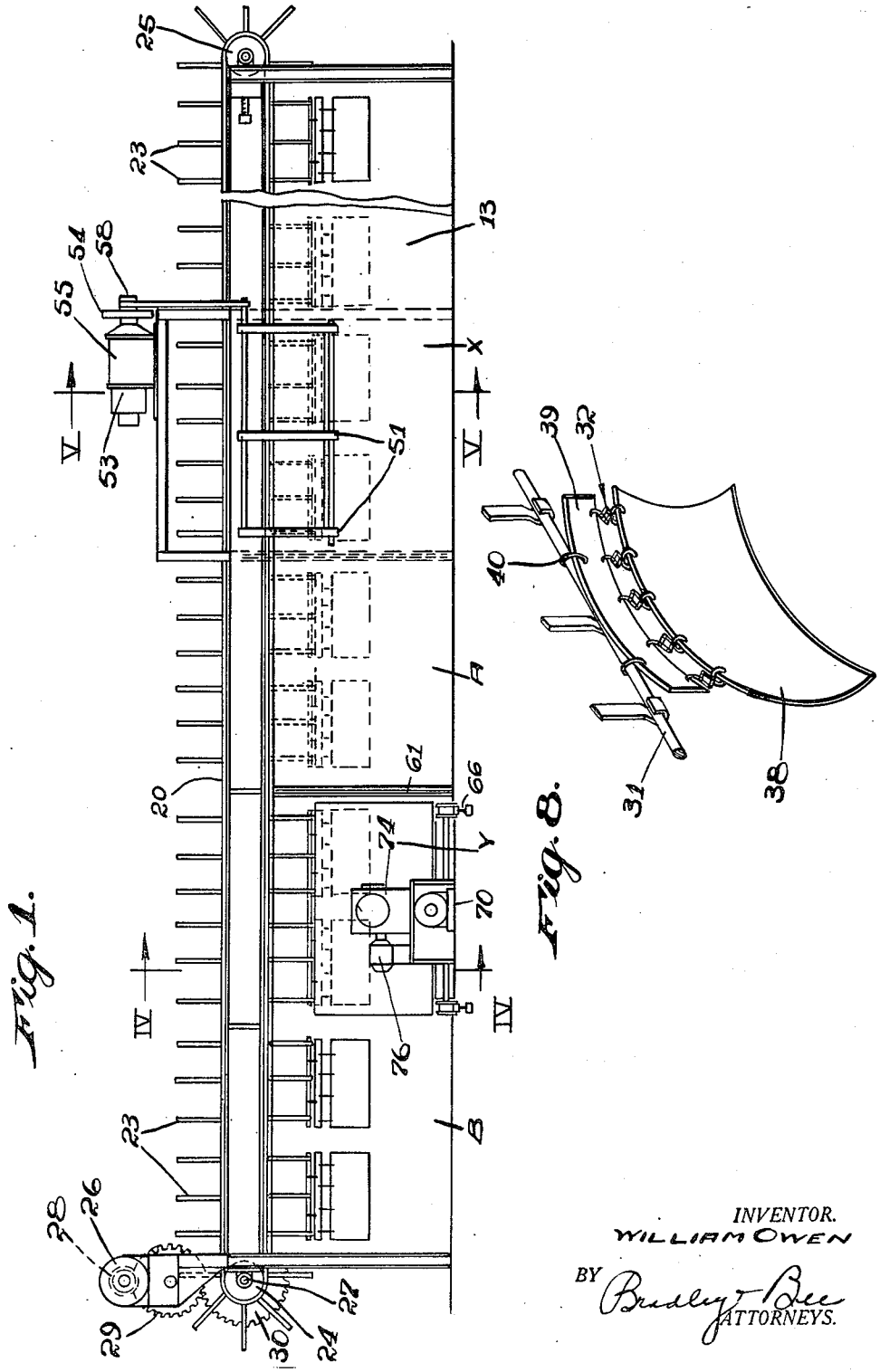
INVENTOR.
WILLIAM OWEN
BY
ATTORNEYS.

July 29, 1941. W. OWEN 2,251,159
PROCESS AND APPARATUS FOR BENDING AND TEMPERING GLASS SHEETS
Filed Dec. 9, 1936 6 Sheets-Sheet 2
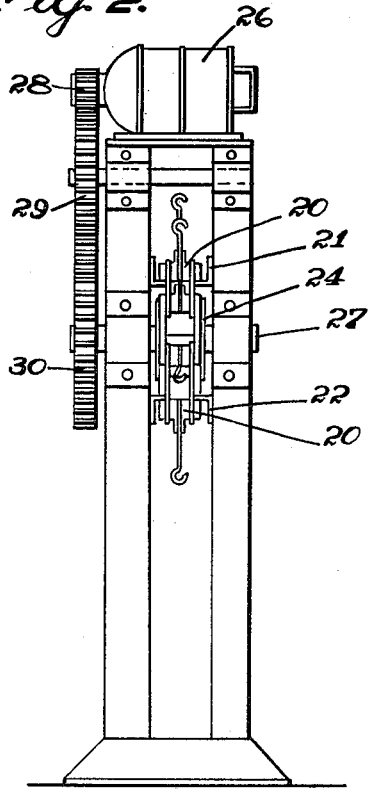
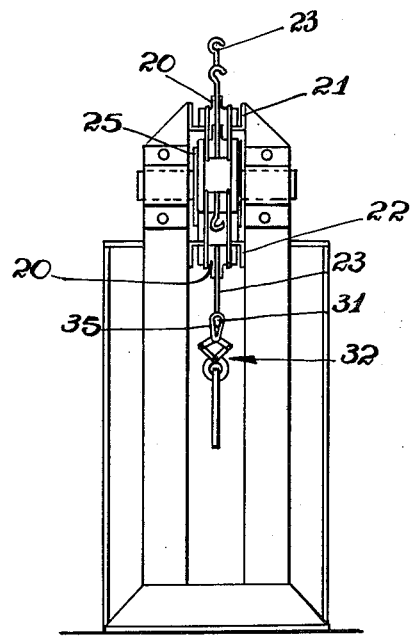
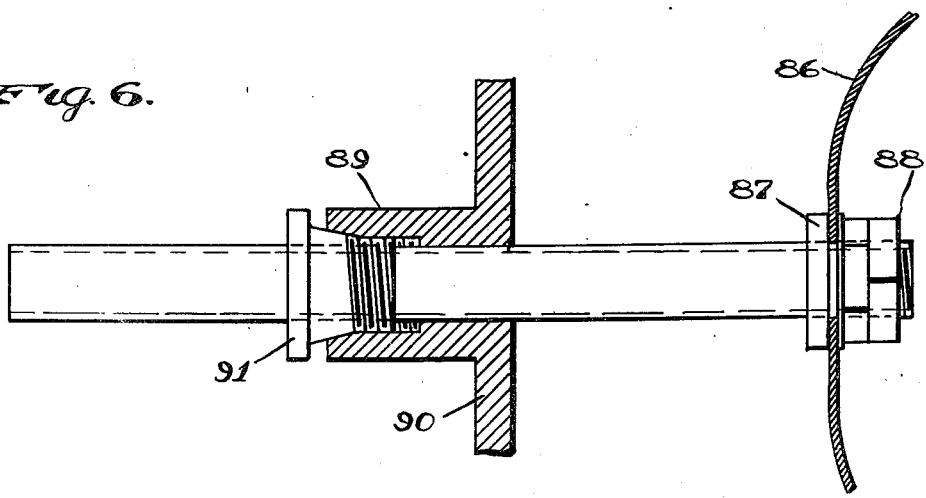
INVENTOR.
WILLIAM OWEN
BY Bradley & Bee
ATTORNEYS.

July 29, 1941. W. OWEN 2,251,159
PROCESS AND APPARATUS FOR BENDING AND TEMPERING GLASS SHEETS
Filed Dec. 9, 1936 6 Sheets-Sheet 3

INVENTOR.
WILLIAM OWEN
BY Bradley + Bee
ATTORNEYS.

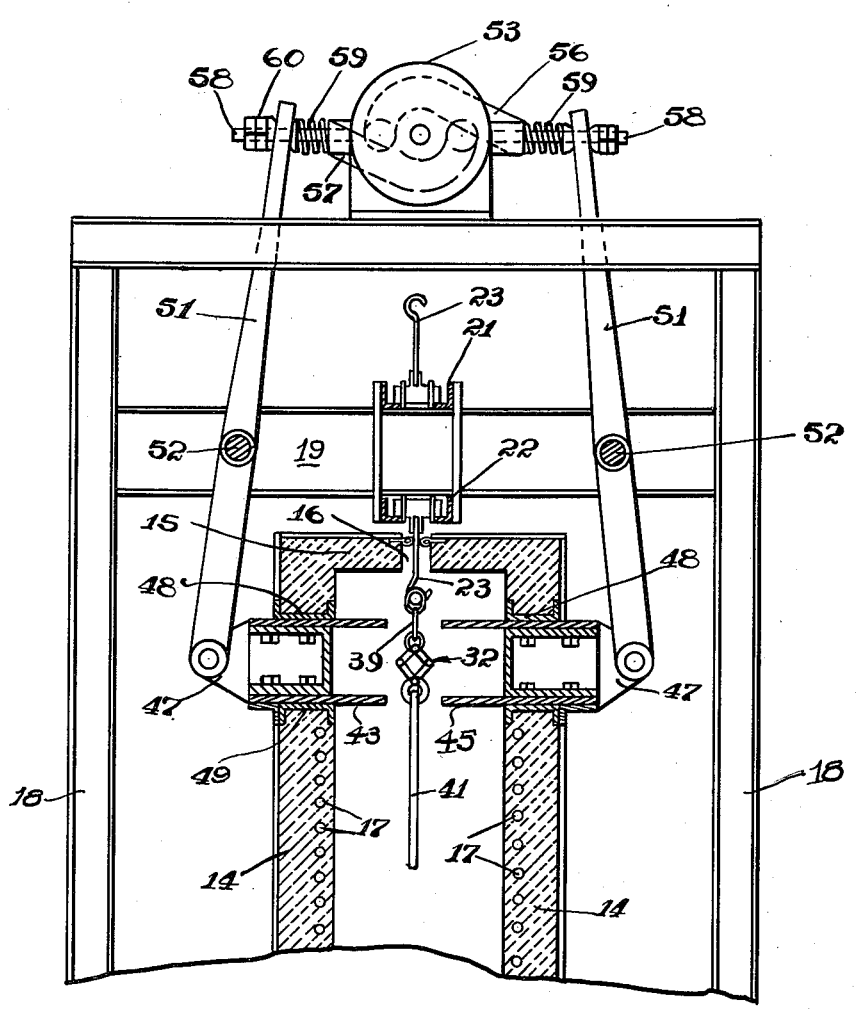

July 29, 1941.  W. OWEN  2,251,159
PROCESS AND APPARATUS FOR BENDING AND TEMPERING GLASS SHEETS
Filed Dec. 9, 1936  6 Sheets-Sheet 5
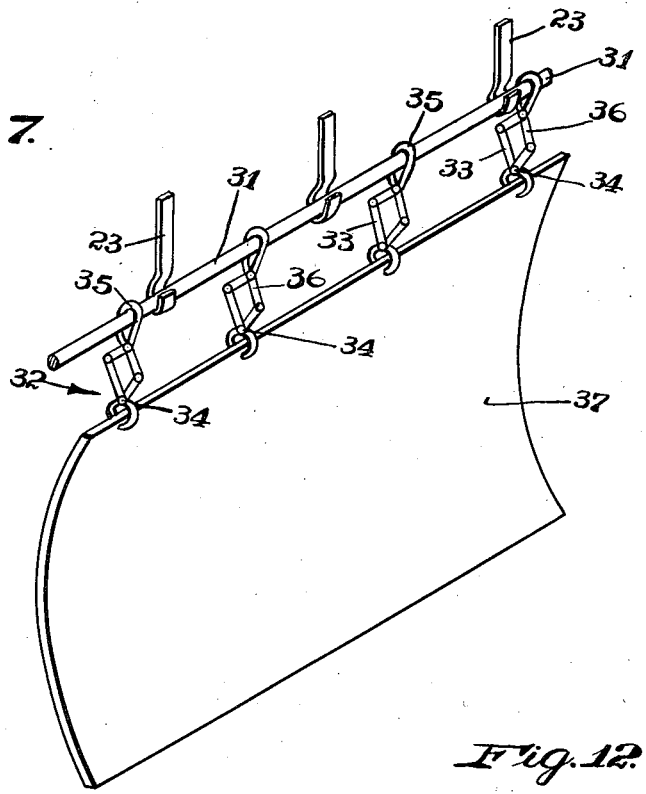
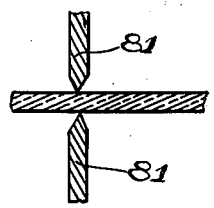
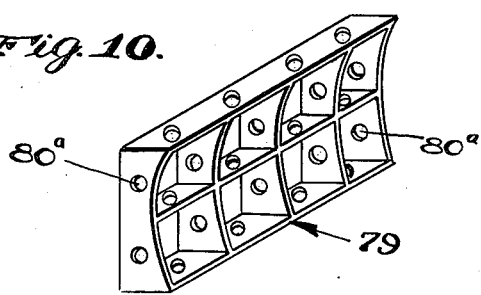
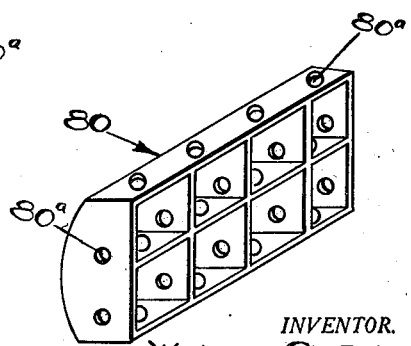
INVENTOR.
WILLIAM OWEN
BY Bradley & Bee
ATTORNEYS.

July 29, 1941.  W. OWEN  2,251,159
PROCESS AND APPARATUS FOR BENDING AND TEMPERING GLASS SHEETS
Filed Dec. 9, 1936  6 Sheets-Sheet 6
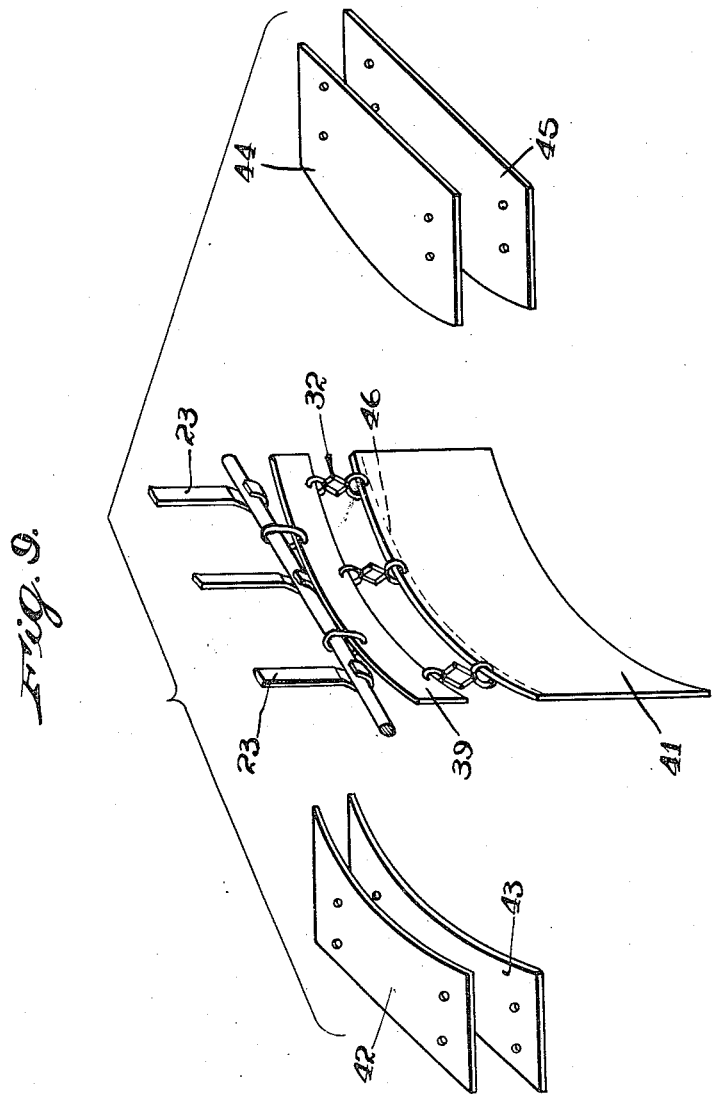
INVENTOR.
WILLIAM OWEN
BY Bradley + Bee
ATTORNEYS.

Patented July 29, 1941

2,251,159

UNITED STATES PATENT OFFICE 2,251,159

PROCESS AND APPARATUS FOR BENDING AND TEMPERING GLASS SHEETS

William Owen, Pittsburgh, Pa., assignor to Pittsburgh Plate Glass Company, Allegheny County, Pa., a corporation of Pennsylvania Application December 9, 1936, Serial No. 114,962

4 Claims. (Cl. 49—1)

The invention relates to a process and apparatus for bending glass sheets, either plate or window glass, and for case hardening such sheets. The invention has for its objects: (1) the provision of an improved process and apparatus permitting the bending of glass sheets while suspended from one edge, so that the heating, bending, and annealing may be carried out in a continuous straight away operation, thus reducing the labor cost and time period to a minimum; (2) the provision of an improved process and apparatus, of the character specified, wherein any marring of the glass, incident to the bending operation is reduced to a minimum; (3) the provision of an improved process and apparatus of the character specified, in which a case hardening operation may be applied to the glass sheets as soon as they are bent and while suspended by their edges, so that the heat required for bending is utilized in the case hardening step, and the time and cost required for both bending and case hardening is only slightly greater than that required for bending; (4) the provision of a process and apparatus of the character specified, which may be utilized for bending and case hardening sheets with curvature in two directions, as well as those with curvature in only one direction, and which may be utilized to good advantage for straight away bending operations in which the sheets are not case hardened or for straight away operations in which the case hardening step is applied in addition to the bending step, (5) and the provision of an improved process and apparatus which permits ready adjustment to take care of varying curvatures. Apparatus for carrying out the process is shown in the accompanying drawings, wherein:

Figure 1 is a longitudinal section through the complete apparatus. Figs. 2 and 3 are end elevations. Fig. 4 is an enlarged section on the line IV—IV of Fig. 1. Fig. 5 is an enlarged section on the line V—V of Fig. 1. Fig. 6 is a fragmentary detail section showing the adjusting means for the air nozzles. Figs. 7, 8 and 9 are detail, perspective views showing various means for supporting the glass sheets from their upper edges, Fig. 9 also showing the presser plates which are employed in bending the glass sheet. Figs. 10 and 11 are perspective views of the grids which are employed on opposite sides of the glass sheet. And Fig. 12 is a detailed sectional view taken through a glass sheet and portions of the grids on opposite sides thereof.

Referring to the drawings, 13 is a tunnel kiln through which the glass sheets to be bent and case hardened are moved upon an endless carrier, such tunnel kiln comprising the side walls 14, 14 of insulating material (Fig. 5) and the top wall 15 which is slotted, as indicated at 16, to permit the passage of the hooks from which the glass sheets are suspended. The kiln is heated to provide a gradually increasing temperature from its right hand end, so that the glass is gradually brought up to the bending temperature as the sheets move through the kiln to the point at which bending occurs. The heating of the kiln may be accomplished in any desired manner, the means shown in Fig. 5 consisting of electrical heating units 17 of the resistance type embedded in the walls of the kiln.

The endless carrier which supports the glass sheets is carried upon a framework independent of the kiln consisting of the upright channels 18 and the transverse channels 19, such framework extending the length of the kiln. Extending longitudinally of the framework are two tracks or runways for the roller chain 20, such runways consisting of the angles 21 for carrying the upper flight of the chain and the angles 22 (Fig. 5) for carrying the lower flight of the chain. Hooks 23 are provided at intervals along the chain for carrying the glass sheets. Those hooks which are carried by the lower flight of the chain move along the slot 16, as indicated in Fig. 5, with their lower ends projecting inside of the kiln. The roller chain passes around sprockets 24 and 25 located at the end of the kiln, the sprocket 24 being driven from the motor 26 carried upon the end of the framework and driving the shaft 27 which carries the sprocket 24 through the intermediary of the spur gears 28, 29 and 30. The motor is of the reversing type, so that it may be driven in either direction for the purposes hereinafter set forth.

The glass sheets may be supported in different ways, depending upon the character of the bending operation, as indicated in Figs. 7, 8 and 9. As shown in Fig. 7, a bar 31 is carried by a plurality of the hooks 23, and such bar in turn carries a plurality of toggle gripping devices 32. These gripping devices each comprise a pair of lever arms 33 pivoted together at 34 and connected to the loop 35 by means of the links 36. The lower ends of the levers 33 which engage the edge of the glass sheet 37 are sharply pointed and of heat resisting material, such as "Askaloy." Due to the toggle arrangement, they grip the edge of the sheet so as to support it securely, since the weight of the sheet tends to close the gripping jaws. The means for supporting the glass sheet 38, as shown in Fig. 8, differs from that of Fig. 7 in that a sheet metal plate 39 is interposed between the bar 31 and the toggle gripping devices 32, such plate 39 being secured to the bar 31 by the links 40. This method of supporting the plate 39 leaves it free to bend with the glass sheet when acted upon by suitable presser devices. The method of supporting the glass sheet 41 of Fig. 9 is the same as that employed in the Fig. 8 construction, the difference in these views being that the sheet 38 of Fig. 8 is bent in two directions, while the sheet 41 of Fig. 9 is bent only in one direction. Fig. 9 further shows the presser plates 42 and 43, and 44 and 45 which are employed for bending the glass. The upper plates 42 and 44 are adapted to engage the sheet metal plate 39 and bend it, while the lower plates 43 and 45 are adapted to engage the upper edge of the glass sheet 41 and bend it, such engagement occurring along the dotted line 46. With the plate, such as the plate 41 which is to be bent in only one direction, the bending means as thus described is sufficient as the body of the sheet will follow the bend imparted along the upper edge thereof, but with a sheet such as 38, shown in Fig. 8, it is necessary to employ other bending means which engage the sheet throughout its area, such as the grid devices shown in Figs. 10 and 11.

When a sheet is to be bent without case hardening, such as the plate 41 of Fig. 9, this is accomplished by the bending mechanism shown in Fig. 5 and located at the point marked X in Fig. 1 near the center of the kiln. If it is desired to both bend and case harden the sheets, such as those shown in Figs. 7 and 8, this is accomplished by the bending and case hardening mechanism shown in Fig. 4 located at the point marked Y in Fig. 1 near the left hand end of the kiln. When one of these mechanisms is in service, the other is, of course, out of commission with its parts so positioned that they will not interfere with the operation involving the use of the other mechanism.

Referring first to the operation involving the bending device shown in Fig. 5 for bending sheets without case hardening them, the bending plates 42 and 44, and 43 and 45 are mounted for sliding movement through the side walls of the kiln and connected to brackets 47, 47, channels 48 and 49 being arranged, as indicated in Fig. 5, in order to provide guides for the plates. The brackets 47, 47 are reciprocated by means of the levers 51, 51 pivoted to the framework at 52, 52. The upper ends of the levers are reciprocated in order to move the presser plates in and out by the motor 53 seated upon the framework. This motor drives a crank disc 54 through the intermediary of suitable reduction gearing in the casing 55 (Fig. 1), and such crank disc has connected thereto a pair of links 56, 57 provided at their ends with rods 58, 58 which extend through openings in the ends of the lever arms 51, 51. Springs 59, 59 are interposed between the ends of the links 56, 57 and the ends of the levers so that the operation of the motor results in the application of yielding pressure to the plates 42, 43, 44 and 45. The tension of the springs is adjusted by means of the nuts 60, 60 which are threaded onto the rods 58, 58. The motor 53 is of the reversing type, and in operating to bend the plate 41, is rotated in a clockwise direction (Fig. 5) to cause the presser plates to approach and bend the metal plate 39 which supports the glass clamps and the glass sheet 41 to the curvature indicated in Fig. 9, such pressure being yieldingly applied by reason of the springs 59, 59. The bending of the plate having been accomplished, the motor is reversed to bring the presser plates back to separated position, as indicated in Fig. 5, at which time the conveyor is operated to move the bent plate forward and bring another plate into position.

In the operation of this bending mechanism, the motor 26, which operates the endless conveyor 20, is driven so that the lower flight of the conveyor is moved from left to right, the glass plates being prepared for application to the hooks 23 at the left hand end of the kiln, and hung thereon one after the other as the conveyor moves forwardly step by step. During the movement of the glass sheets from the left hand end of the kiln to the position indicated at X where the bending mechanism is located, they are gradually brought up to a temperature in the neighborhood of 1200 deg. F. so as to be readily subject to bending by the presser plates 42, 43, 44 and 45, the metal plates 39 which support the glass sheets being also brought to a red heat, so that they may be bent without difficulty and after once being bent will have no tendency to straighten out. After the glass sheets are bent at X, their movement is continued through the right hand end of the kiln which is heated to provide a gradually decreasing temperature. During this period of movement, the glass hardens, passes through the annealing range and arrives at a temperature such that the glass sheet and its supporting mechanism, including the plate 39 and rod 31 may be handled without difficulty. As the sheets arrive at the right hand end of the kiln, they are removed and released from the hooks 23. The supporting means, including the rods 31 and plates 39 are taken back to the left hand end of the furnace for reuse, all that is necessary in order to prepare them for reuse being the straightening of the plates 39, which is readily accomplished in a suitable press.

When it is desired to case harden the glass sheets as well as to bend them, the mechanism shown in Fig. 4 is employed, such mechanism being located at the point marked Y in Fig. 1, as heretofore pointed out. Assuming that the glass sheet to be bent is to have curvature in one direction only, such as the sheet 37 shown in Fig. 7, the sheet is supported, as indicated in Fig. 7, and is started from the right hand end of the furnace, the motor 26 being operated so as to move the lower flight of the conveyor from right to left. In order to bend and case harden the sheet, it is gradually heated in section A of the kiln (Fig. 1) to the right of the bending and case hardening apparatus. This section of the kiln is provided with horizontally sliding doors 61, which permit the section to be cut off from the rest of the kiln, so that such section may be raised to a relatively high temperature as compared with the rest of the kiln. The glass sheet is brought in this section of the kiln to a temperature approximating the softening point, so as to permit of the bending and case hardening operation later described. A further movement of the conveyor to the left brings the glass sheet between the headers 62 and 63 (Fig. 4) of the bending and case hardening apparatus. These headers are mounted upon a pair of trucks 64 and 64 supported on the tracks 66, so that in the bending and case hardening operations, the headers may be moved toward and from each other.

This movement of the headers toward and from each other is accomplished by means of a screw 67 threaded through nuts 68 and 69 at the ends of the trucks. When this screw is rotated in one direction, the trucks are moved toward each other and when moved in the reverse direction, the trucks are moved away from each other. The rotation of the screw is accomplished by the use of an electric motor 70 which operates the screw through the intermediary of a slip clutch 71 whose parts are pressed into yielding engagement by the spring 72. The purpose of this yielding drive is to insure a yielding engagement between the bending devices and the glass sheet, as later described, so as to avoid the possibility of undue pressure being applied to the glass and to avoid the requirement of a very accurate operation of the motor 70. Air is supplied to the headers 62 and 63 from the blowers 73 and 74 driven from the motors 75 and 76, a connection being provided in the form of tubes 77 and 78. Since the headers are moved back and forth and the blowers are stationary, it is necessary to provide an extensible connection, and in the present instance, this is accomplished by making the tubes 77 and 78 of rubber.

In order to bend the glass sheet when the headers approach each other, bending means are provided in the form of the grids 79 and 80 shown in Figs. 10 and 11. These are preferably of wood and perforated, as indicated at 80ª in order to provide for a free flow of air during the case hardening operation, as later described. In order to provide for a minimum of contact between the grids, the front portions of the bars which make up the grids are beveled, as indicated at 81 in Fig. 12. The grids are preferably of wood or some other relatively soft material in order to avoid marring the glass. Wood is particularly suitable because the surfaces contacting the glass become charred and a carbon surface in contact with a softened glass surface is not liable to mar such surface, as is well known in the glass art. The grids are supported upon the front sides of the headers by means of the brackets 82 and 83, which are readily removable to permit the substitution of grid members of different curvature depending on the requirements of the operation.

In order to chill the surface of the glass sheet after it is bent and while it is held between the grid members, the headers are provided with the two sets of nozzles 84 and 85. As indicated in Fig. 4, these nozzles are distributed over the area of the glass sheet and are so positioned that their forward ends follow the contour of the glass sheet, thus insuring a more uniform application of air to all portions of the surface of the sheet, than would be the case, if the nozzles all had their front ends in the same vertical plane. The nozzles are all mounted for horizontal adjustment so that they may be adjusted to suit glass plates of varying curvature. In order to provide for the adjustment of the connections between the air space in the header and the ends of the nozzles, such ends are carried by a rubber diaphragm 86, so that it is possible to adjust the nozzles within a range covering all curvatures of sheets which have to be taken care of. The method of mounting the nozzles for adjustment and for attaching them to the diaphragm is shown in Fig. 6. The tube is threaded at its rear end where it passes through the diaphragm 86, and carries a pair of opposing nuts 87 and 88 between which the edge of the diaphragm is clamped, thus insuring a relatively tight joint. The forward end of the tube extends through a collar 89 integral with the header plate 90 through which the nozzle extends, and a clamping action is secured by means of a split nut 91 which embraces the nozzle and is threaded into the collar.

The bending and case hardening mechanism is preferably made of such size as to handle two sheets of glass at one time, this being indicated in Fig. 1, and after the bending and case hardening operation, the conveyor is moved to the left to bring the two sheets which have been bent and case hardened into the section B at the end of the kiln where they remain during the treatment of another pair of sheets in the bending and case hardening mechanism. As these two sheets emerge from the left hand end of the kiln in the next movement of the conveyor, they are removed from such conveyor and placed upon suitable transfer means not shown.

When it is desired to bend the glass sheet in two directions, such as is shown at 38 in Fig. 8, the method of support is changed from that of Fig. 7, so as to include the metal plate 39. This is necessary, since the upper edge of the glass sheet is to be bent, and the support for such edge must follow the same contour. When this form of support is employed in connection with the bending and case hardening mechanism, the grid devices similar to those shown in Figs. 10 and 11 are employed as heretofore described, such grids being suitably modified in shape, but in addition, it is necessary to use a pair of plates corresponding to the plates 42 and 44 shown in Fig. 9 for engaging and bending the metal plate 39. This is easily taken care of in the apparatus of Fig. 4 by adding a pair of plates similar to 42 and 44, which plates are carried upon the brackets 83 which support the bending grids. The operation, as far as these plates are concerned, is the same as heretofore described in connection with the portion of the device shown in Fig. 5.

It is also possible to bend and case harden sheets, such as shown in Fig. 9, in the portion of the apparatus marked Y in Fig. 1. In such case, the bending grids of Figs. 10 and 11 are not necessary, all that is required being bending mechanism, such as that shown in Fig. 5, which is mounted upon the upper portions of the headers 62 and 63. The case hardening means involving the use of the sets of tubes 84 and 85 whose ends follow the contour of the glass sheet will be precisely the same as heretofore described in connection with the bending of the plate 38 of Fig. 8.

What I claim is:

1. A method of bending and case hardening a glass sheet which consists in suspending it in a vertical position by its upper edge, heating the sheet until the glass is at the softening point, applying pressure to the opposite sides of the sheet while in its suspended position to bend it so that it is curved from top to bottom on lines transverse to the horizontal, holding the sheet in bent position under pressure and chilling it while held in such position by applying air blasts to both faces thereof.

2. A method of bending and case hardening a glass sheet which consists in suspending it in vertical position by its upper edge, heating the sheet until the glass is at the softening point, applying pressure over the area of the sheet along spaced lines extending transversely of the sheet in both directions to bend it to the desired configuration, and chilling the sheet while such pressure is being exerted by applying blasts of air against both sides of the sheet.

3. A method of bending and case hardening a glass sheet which consists in suspending it in a vertical position by its upper edge from a metal plate in parallel with the glass sheet and free to bend therewith, heating the sheet and the plate until the glass is at the softening point, applying pressure to the sheet and plate and bending them concurrently along a common continuous curvature, and chilling the heated and bent sheet by applying air blasts to both of its faces while continuing the step of applying pressure.

4. Means for bending and case hardening a glass sheet which is suspended in vertical position by its upper edge, comprising a pair of headers mounted for movement toward and from the plane of the sheet on opposite sides thereof, a curved bending member on each header in the form of a curved openwork grid substantially coextensive with the area of the glass sheet, such members being reversely curved, a set of nozzles on each header and connected thereto whose outlet ends are arranged to correspond to the curvature of the grids, and means for supplying air under pressure to the headers; said nozzles being secured in the headers for longitudinal adjustment to permit their use with grids of varying curvature.

WILLIAM OWEN.